March 18, 1924.
H. SANDER
ANIMAL TRAP
Filed Feb. 19, 1921
1,487,479
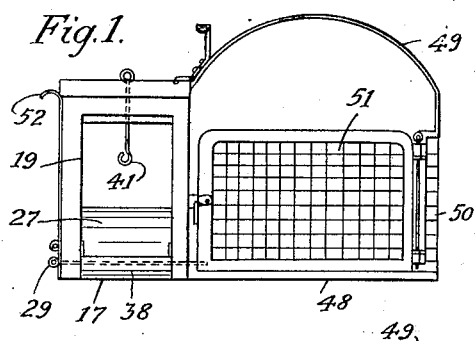
Fig. 1.
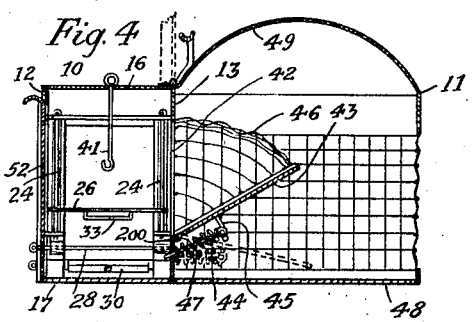
Fig. 4.
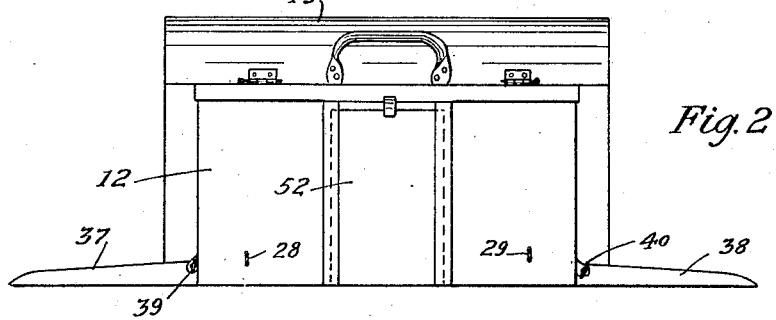
Fig. 2.
Fig. 3.
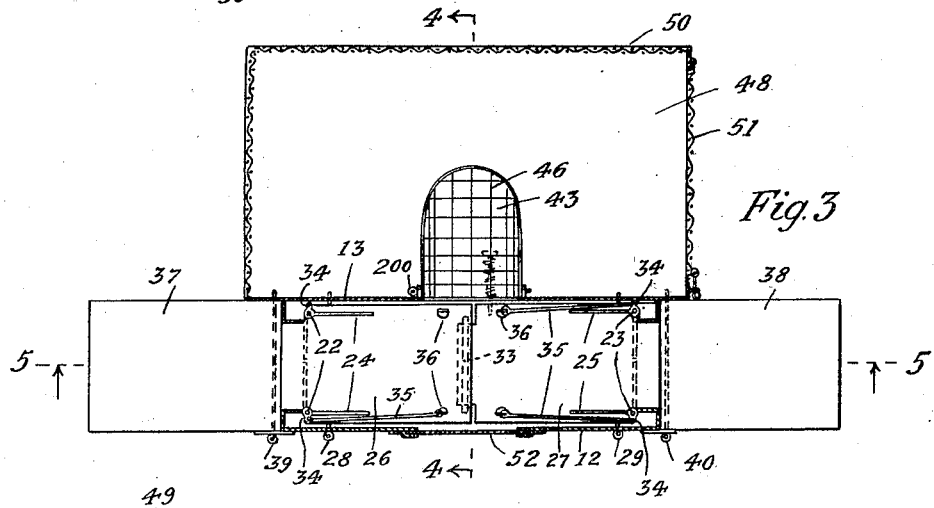
Fig. 5.
Inventor:
Herman Sander
By
his Attorney.

Patented Mar. 18, 1924.

1,487,479

UNITED STATES PATENT OFFICE.

HERMAN SANDER, OF FARGO, NORTH DAKOTA.

ANIMAL TRAP.

Application filed February 19, 1921. Serial No. 446,255.

*To all whom it may concern:*

Be it known that I, HERMAN SANDER, a citizen of the United States, residing at Fargo, in the county of Cass and State of North Dakota, have invented a new and useful Improvement in Animal Traps, of which the following is a specification.

My invention relates to animal traps and has for its object to provide a trap in which an animal can be caught, including a cage into which the animal is led after it has entered the trap so that any number of animals may be successively caught within the trap and led into the cage.

Another object of the invention is to provide means for automatically closing the trap after the animal has entered the same and for leading the animal into the cage, said automatically closing means becoming reset as soon as the animal leaves the trap.

Another object is to provide the trap portion of my invention with a pair of openings opposite one another so that when the trap is open the animal can see completely through the trap.

In carrying out the objects of my invention I provide a trap having openings at two opposite ends thereof provided with simultaneously operated closure members actuated by a pair of false floors, said closure members being adapted to be closed after the animal enters the trap from either of said doors and puts its weight upon the two false floors connected therewith, or adapted to be immediately opened upon the animal leaving the trap. In conjunction with this trap I provide a cage, entrance to which is had by means of a trap door leading from the trap proper to said cage.

The full objects and advantages of my invention will appear in connection with the detailed description thereof and are particularly pointed out in the claims.

In the drawings, illustrating the application of my invention in one form:

Fig. 1 is an end elevational view of my invention.

Fig. 2 is a side elevational view of the same taken from the trap side.

Fig. 3 is a plan sectional view of the invention.

Fig. 4 is a sectional elevation view taken on line 4—4 of Fig. 3.

Fig. 5 is a sectional elevational view taken on line 5—5 of Figure 3.

My invention comprises primarily a trap 10 and a cage 11 mounted adjacent each other as best shown in Figs. 1 and 3. The trap 10 comprises side walls 12 and 13 end walls 14 and 15, a top 16 and a bottom 17. The end walls 14 and 15 are provided with openings 18 and 19 which have jambs 20 and 21 extending around the same which are secured to said walls. To the sides of the jambs 20 and 21 are pivoted by pintles 22 and 23, pairs of double swinging doors 24 and 25 which are adapted to swing into the positions shown in Figs. 4 and 3 in full lines, to permit of access into the trap or to take the position shown in dotted lines in Fig. 3, to close the openings 18 and 19. When these doors are open, an animal can see right directly through the trap so that the animal has little fear of entering it. Within the trap 10 I provided two false floors 26 and 27 which are pivoted near their ends in proximity to the doors 24 and 25 by pintles 28 and 29 extending through the walls 12 and 13 of the device. These pairs of floor members are provided with counter weights 30 and 31 positioned at the extreme lower ends thereof and are caused to simultaneously travel downward by means of a hooked tongue 32 formed on floor member 27 which engages a wide staple 33 attached to the underside of floor member 26. When pressure is exerted on floor member 26 the said floor member engages the tongue 32 and depresses both of the floor members 26 and 27 to the positions shown in dotted lines in Fig. 5, when the end of tongue 32 catches on the staple 33 and prevents further movement of the device. When pressure is exerted upon the floor member 27 tongue 32 bears down upon the staple 33 and the same action takes place as when the pressure is exerted upon the floor member 26. Through the action of the counter-weights 30 and 31 the floor members 26 and 27 are normally held in the position shown in full lines in Fig. 5 and are quickly brought to the position shown in dotted lines in this figure when the weight is brought upon either of these floor members. As soon as the weight is removed from the same, said floor members immediately resume their normal positions.

The doors 24 and 25 are automatically opened and closed by means of the floor members 26 and 27. Each of the doors 24 and 25 has secured to it a short crank arm 34 to which is pivoted a link 35 pivotally connected to the respective floor members 26 and 27 by an eye bolt 36 near the upper ends thereof. The cranks 34 are so positioned as to cause the doors to become open when said floor members are depressed and to immediately close as the floor members are raised. The action of the device is very simple. The animal gains access to the trap at either end of the trap through the openings 18 and 19 over ramped approaches 37 and 38 which are pivoted to the trap at 39 and 40, said ramps leading up to the inclined floor members 26 and 27.

In the normal position of floor members 26 and 27 the lower portions of the same rest upon the approaches 37 and 38 so as the animal enters the trap no movement of the said floor members occurs until the animal has passed well beyond the pintles 28 and 29. As soon as the animal is well towards the center of the trap, floor members 26 and 27 due to the weight of the animal upon them immediately commence to descend, doors 24 and 25 swinging back into their closing position. In the event that the animal is not sufficiently far within the trap the door members 24 or 25 tend to strike the animal in the vicinity of its rear flanks. This startles the animal and it immediately attempts to escape, but due to the instinct of animals it prefers to go straight ahead where it can see the light rather than to back up. This action on the part of the animal immediately causes it to free itself from the clamping action of the doors 24 and 25 and bring the animal completely within the trap allowing said doors to close tight. The animal can never escape after being once partly within the trap. As the doors 24 and 25 open and close simultaneuosly the opening at the farther pair of doors where the animal attempts to escape can never be greater than the opening at the rear doors which would be engaging his body in the event that he was not fully within the trap so that even if the doors did not close farther the animal would be unable to pass through the opening in the doors ahead of him. However, as soon as the animal arrives on the meeting ends of the floor members 26 and 27 doors 24 and 25 close very rapidly. A bait hook 41 is hung from the center of the trap to which any suitable bait may be attached to attract the animal into the trap.

The entire trap member 10 is made without windows so that the interior of the same is quite dark excepting for an opening 42 in the wall 13 thereof. The wall 13 has pivoted to it immediately below the opening 42 at 200 an inclined trap door 43 which normally takes the position shown in full lines in Fig. 4. Door 43 leads to the cage 11 and is adapted to be depressed downwardly to the position shown in dotted lines in Fig. 4. A coil spring 44 seated at one end against the wall 13 and at its other end against an arm 45 secured to said door causes the door 43 to resume its normal position after the same has been depressed and the weight causing the depression removed therefrom. A pin 47 pivoted to arm 45 and passing through wall 13 serves to guide the spring 44 and hold it in proper position to perform the functions for which it is designed. A guard 46 positioned over the door 43 as shown in Figs. 3, 4, and 5, together with said door 43 forms a closure member for the opening 42. When an animal treads on door 43 said door is immediately depressed making an opening between the guard 46 in said door through which the animal can readily escape to the cage 11. The exact operation of this device will be presently described.

Cage 11, as best shown in Figs. 1, 3, and 4, comprises a bottom 48, a semi-cylindrical top 49 and a wire inclosure member 50 extending around the same on one side and one end. The other end of the device is provided with a wire door 51 which is adapted to be opened and closed from the exterior to permit of the removal of the animals from the trap, while the fourth wall is formed by wall 13 of the trap 10, which wall is common to both devices. With the wire inclosure member 50 light is readily brought into the cage 11 and also into the trap 10 through wire guard 46. The purpose of this wire guard 46 is as follows: As soon as the animal has been trapped within the trap 10 the animal immediately seeks means of escape. The trap being completely dark excepting for the light penetrating through cage 11 and the guard 46, the animal makes way towards this light spot. As soon as the animal steps on trap door 43 the same depresses and due to its inclined position, as shown in dotted lines, leads the animal into the cage 11. As soon as the animal is well within said cage spring 44 returns the trap door 43 to its normal closed position and the trap is again set and in readiness to catch another animal.

To provide access into the trap proper of my invention I provide a sliding door 52 on the side wall 12 thereof through which all of the interior mechanism of the trap may be easily put together or removed. This door also gives accessibility to the bait hook 41 when it is desired to replace the bait.

I have tried my invention for catching rats and other similar animals and have found it very successful. In using it for this purpose I place the wall 12 of the device next to the wall of a building. Inasmuch as rats have an instinct to follow around the buildings through the tunnels and passage-ways formed by lumber and other materials piled along buildings through which the rat can see a clear passageway said animal does not hesitate in the least to attempt to pass through the trap in the act of securing the bait on his way through. I have watched the operation in a great number of instances and have found that the trap never fails to operate. It becomes evident that the trap can be built of any proportion so as to catch any kind of animal desired.

The advantages of my invention are manifest. The trap is absolutely positive in action and does not in any way scare the animal or cause the animal to hesitate in entering the same, once the animal is within the trap or partly within the trap it has no chance of escape. All of the features of the trap are designed so as to cause the animal through his natural instincts to be led through the trap into the cage proper in the desired manner. The device is entirely automatic so that no attendance is necessary, thereby relieving the user of the trap of the customary duty of making his rounds to remove the animals and reset the traps. The entire trap can be very cheaply constructed and the parts are so designed that the operating mechanism will not get out of order. The particular construction is very delicate in operation so that the trap can be used with small animals as well as animals of larger size.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. A trap comprising an enclosure having an opening therein, a closure member for said opening falling short of the bottom of said opening, an inclined operating floor member positioned below said closure member, a ramp leading up to said operating floor member and a rearwardly positioned extension on said operating member for over-lapping said ramp to form a smooth passageway into the trap.

2. A trap comprising an enclosure having an opening therein, a closure member for said opening falling short of the bottom of said opening, an inclined operating floor member positioned below said closure member, a ramp leading up to said operating floor member and a rearwardly positioned extension on said operating member for over-lapping said ramp to form a smooth passageway into the trap, and a counter-weight mounted on the underside of said operating floor extension for returning the same to its normal position.

3. A trap comprising an enclosure having side and end walls, openings formed in said end walls, ramps pivoted to said enclosure positioned to lead up to said end walls, said ramps being adapted to swing upwardly to cover the openings and lie flat against the faces of said end walls.

4. A trap comprising an enclosure having side and end walls, openings formed in said end walls, ramps pivoted to said enclosure positioned to lead up to said end walls, said ramps being adapted to swing upwardly to cover the openings and lie flat against the faces of said end walls, a cage secured to one of said side walls, said cage being of a length greater than that of said enclosure so that when said ramps are folded upwardly the cage and enclosure are of uniform width.

5. A cage comprising an enclosure, a pair of openings in said enclosure, closure members for said openings and a pair of movable floor members for operating said closure members, said floor members being pivoted for downward movement near said openings, a downwardly curved lip formed on the inner end of one of said closure members, an over-lapping end formed on the other of said closure members and adapted to rest upon said curved lip, and a keeper for holding said over-lapping end movably positioned upon said lip.

6. A cage comprising an enclosure, a pair of openings in said enclosure, closure members for said openings and a pair of movable floor members for operating said closure members, said floor members being pivoted for downward movement near said openings, a downwardly curved lip of a width less than said closure member formed on the inner end of one of said closure members, an over-lapping end formed on the other of said closure members and adapted to rest upon said curved lip, and a staple adapted to extend across said lip and secured to said over-lapping end for holding the same movably positioned upon said lip.

7. A trap comprising an enclosure, means for trapping an animal within the enclosure, a cage adjoining said enclosure, an opening communicating between said enclosure and cage, an upwardly extending inclined trap door pivoted for downward movement at the lower edge of said opening, a downwardly extending ear formed on said trap door near the center portion thereof, a rod pivotally connected to said ear at one end and slidably mounted on said enclosure immediately below the point of pivot of said trap door thereto, and a compression coil spring mounted on said rod for holding the trap door in its normal position.

HERMAN SANDER.